United States Patent [19]
Dean et al.

[11] Patent Number: 5,303,326
[45] Date of Patent: * Apr. 12, 1994

[54] BROADCAST DIGITAL SOUND PROCESSING SYSTEM

[75] Inventors: Gregory L. Dean; Gordon L. Elliott, both of Overland Park, Kans.

[73] Assignee: Computer Concepts Corporation, Lenexa, Kans.

[*] Notice: The portion of the term of this patent subsequent to Jul. 7, 2009 has been disclaimed.

[21] Appl. No.: 909,183

[22] Filed: Jul. 6, 1992

Related U.S. Application Data

[63] Continuation of Ser. No. 503,444, Mar. 30, 1990, Pat. No. 5,129,036.

[51] Int. Cl.$^5$ .............................................. G10L 5/00
[52] U.S. Cl. .......................................... 395/2; 381/29; 381/36
[58] Field of Search ........................ 395/2; 381/29-36; 358/144; 370/109, 110.1

[56] References Cited

U.S. PATENT DOCUMENTS

| | | | |
|---|---|---|---|
| 4,665,514 | 5/1987 | Ching et al. | |
| 4,723,285 | 2/1988 | Le Roy et al. | |
| 4,864,620 | 9/1989 | Bialick | |
| 5,129,036 | 7/1992 | Dean et al. | 395/2 |

OTHER PUBLICATIONS

VP600 Brochure, Antex Electronics, 16100 Figueroa St., Gardena, Calif. 90248 (213)532-3092, date unknown.
VP620E Brochure, Antex Electronics, date unknown.
VP635 Brochure, Antex Electronics, Nov., 1988.
VP625 Brochure, Antex Electronics, 16100 Figueroa St., Gardena, Calif. 90248, (213)532-3092, Oct., 1989.
SX-10 Brochure, Antex Electronics, Mar., 1989.
OKI Real Voice Products Brochure, OKI Semiconductors, date unknown.
DSP-32C Brochure, Ariel Corporation, 433 River Road, Highland Park, N.J. 08904, (201)249-2900, May 1, 1989.
MM-96 Brochure, Ariel Corporation, 1990.
DSP56001 Brochure, Spectrum Signal Processing, Inc., (508)366-7355, date unknown.
16-Bit Stereo Brochure, Spectrum Signal Processing, Inc., date unknown.

*Primary Examiner*—Dale M. Shaw
*Assistant Examiner*—Kee M. Tung
*Attorney, Agent, or Firm*—Litman, McMahon & Brown

[57] ABSTRACT

A broadcast digital sound processing system includes an ISA (Industry Standard Architecture) bus compatible personal computer with a hard disk drove and a sound processor board installed in an expansion slot of the computer. The board includes a stereo input, analog to digital converter (ADC) and a stereo set of digital to analog converters (DAC's) interfaced to a digital signal processor (DSP) chip. A stereophonic audio signal is converted to digital data by the ADC and communicated to the computer by the DSP chip through a two port record first-in/first-out (FIFO) buffer for storage on the disk. A program is played back by communicating a program data file through a two port playback FIFO buffer to the DSP and from there to the DAC's for reconstruction to a stereo set of analog signals. The reconstructed audio signals may then be used as a modulating signal for radio broadcasting.

22 Claims, 3 Drawing Sheets

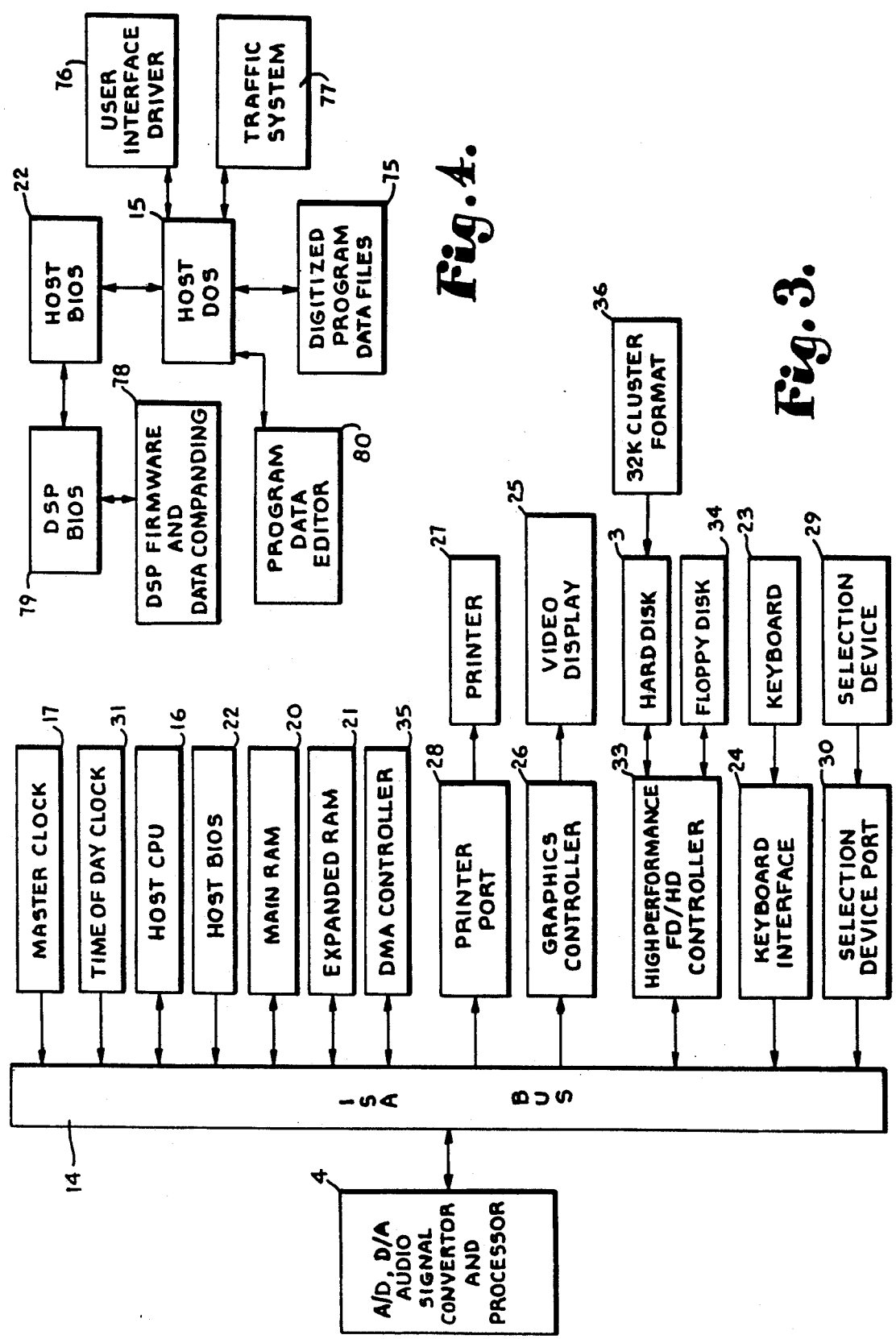

BROADCAST DIGITAL SOUND PROCESSING SYSTEM

CROSS-REFERENCE TO RELATED APPLICATION

This is a continuation of copending U.S. application Ser. No. 07/503,444 filed on Mar. 30, 1990 entitled BROADCAST DIGITAL SOUND PROCESSING SYSTEM which is now U.S. Pat. No. 5,129,036.

FIELD OF THE INVENTION

The present invention relates to signal recording and, more particularly, to digitally recording broadcast quality stereophonic audio signals on a personal computer hard disk and playing back the signals for broadcast over the air.

BACKGROUND OF THE INVENTION

Conventionally, radio advertising commercials are recorded on four-track tape cartridges which are arranged in a rack in a radio station broadcast booth. Other sound programs are recorded and handled in a similar manner, such as station identifier messages, jingles, program lead-ins and fade-outs, background sounds, musical recordings, and the like. When a cartridge is to be played, a disk jockey finds the desired cartridge, manually removes it from the rack, inserts it into a tape cartridge player and starts the tape to play. If the cartridge is a recording of an advertisement, an entry is made on a log sheet which provides data for notifying the sponsor that the number of plays contracted for have occurred.

The process of playing such tape recorded messages must be monitored in case a malfunction should occur. The tapes are subject to wear which degrades the sound quality, breakage, and cartridge malfunctions. The tape cartridge player is also subject to wear, tape head magnetization, and mechanical malfunctions which require that it be serviced periodically to avoid breakdowns and diminished sound quality.

Magnetic tape has developed to be the most practical medium for recording audio signals using analog techniques. There are also a number of digital techniques for recording audio signals. Digital media for recording relatively long programs, such a musical albums, include laser read compact discs (CD's) which are currently widely available and digital audio tape (DAT) which is just beginning to enter the market at this time. One advantage of digital sound recording over analog methods is that there is virtually no degradation of sound quality in duplicating a digital sound signal since digital copying involves copying binary codes rather than complex waveforms. While compact discs and digital audio tape can provide high enough sound quality recordings for broadcast use, they would require manual selection and queuing procedures similar to conventional tape cartridges. Further, compact discs are not well suited to low production runs and on-the-spot production, such that recording commercial messages thereon would be prohibitively expensive and require a long turnaround time between production and airing.

A number of personal computers have capabilities for playing fairly sophisticated sound programs, including stereophonic signals. For the most part, such facilities are digitally controlled music and noise synthesizers in which digital codes are sequenced to sound processor circuits to generate musical tones with selected envelopes and other qualities. There is also circuitry for synthesizing "speech" from data, including text data. Current musical synthesizer instruments often incorporate so-called "samplers" which perform analog-to-digital conversions on sounds, including vocal and musical sounds and random noises, which can then be altered in pitch and other qualities for incorporation in musical performances. Finally, there are devices for digitizing and playing back speech sounds, such as voice mail systems for recording telephone message and the like. To date, there are no systems available for on-the-spot digitally recording analog audio signals in stereo and playing back the signal at broadcast quality standards in real time which are economically practical to individual radio stations.

SUMMARY OF THE INVENTION

The present invention provides a system for on-the-spot digital recording of stereophonic audio signals on a hard disk of a personal computer (PC) and the playback of the signal in real time and at broadcast levels of sound quality. The system includes a sound processor board positioned in an input/output (I/O) slot connector of the PC. On the sound board there is a digital signal processor chip which controls the analog to digital (A/D) conversion of the audio signal, the communication of data bytes comprising the digitized sound signal to the PC for storage on the hard disk thereof, the retrieval of the data bytes from the PC, and the digital to analog (D/A) conversion thereof to reconstruct the original analog signal.

The personal computer may be a conventional computer and, preferably, is compatible with the Industry Standard Architecture (ISA) bus which is derived from IBM PC/AT computer (International Business Machines Corporation). The PC is equipped with a high performance, large capacity hard disk which stores the data representing the digitized audio signal, as well as the operating system for the computer, downloadable firmware for operating the digital sound processor (DSP) chip, and communication software for enabling the communication of data between the sound processor board and the PC. The digital sound processor chip is a high speed integrated circuit which functions as a slave processor or coprocessor to control the handling of digitized signal data. The DSP has its own local read-write memory (RAM) and operates at a high clock rate which is independent of the clock rate of the central processing unit of the PC. The sound processor board includes a stereo input analog to digital converter (ADC) and at least one stereo set of digital to analog converters (DAC) which communicate with the DSP serially.

A principal feature of the present invention is the manner of interfacing the DSP to the PC in such a manner as to achieve a data rate high enough to play back digital sound signals in real time and at a desired sound quality. The digital sound processor system interfaces the DSP to the PC, for sound data transfer purposes, by the use of two-port first-in/first-out (FIFO) buffers. The DSP and PC are able to transfer data bytes into and out of the FIFO buffers asynchronously and, to a great extent, independently of one another. Thus, for example, in a recording situation, the DSP clocks data bytes into a record FIFO until a data block of a selected size is accumulated, whereupon an interrupt is sent to the PC to transfer the block out of the FIFO and to the hard disk. The data block transfer by the PC is accomplished without disturbing the operation of the DSP which, in the meantime has continued to clock bytes into the FIFO. Data transfers for playback occur in the reverse direction in much the same manner using a separate playback FIFO.

The DSP chip is programmed with the capability of compressing the digital program data for storage and expansion thereof for playback to lessen the storage requirements per given signal length on the disk drive. This additionally increases the effective transfer rate of program data between the DSP and the PC. Another factor which increases the program data transfer efficiency in the present invention is the formatting of the disk drive for large data clusters, such as 32 kilobyte clusters. This ensures that large blocks of the program data will reside in contiguous sectors on the disk which minimizes disk head activity in writing and reading to the disk medium and thereby minimizes delays associated with such head activity.

The ADC of the present invention has left and right stereo inputs and outputs digital codes for left and right samples within the same sampling period in alternation and in a serial stream which is transferred to the DSP chip by a serial logic arrangement. During playback, the serial logic arrangement receives alternating left and right digital words which are fed to separate left and right DAC's. The reconstructed analog stereo signals are amplified to levels capable of driving further analog audio stages, such as a stereo audio control console which outputs to the RF transmitter stages of a radio station. The system preferably has the capability of playing back two stereo signals substantially simultaneously. In a radio broadcasting setting, this allows effects such as crossfading the ending of one message with the beginning of the next message to smooth the transition therebetween. For this capability, the system is provided with two playback FIFO's for interfacing between the PC and the DSP board. The two digitized stereo signals are mixed digitally by the DSP chip.

The system includes software drivers to allow control of recording and playback of program messages using the keyboard, video display, and a point and select device, such as a mouse or trackball of the PC. Software provisions are made for scheduling the automatic playing of messages and on-screen countdown timers to track the progress of messages being played. A software interface may be provide to traffic system software which logs the airing of programs for which royalties are due and commercials for which sponsors contract certain numbers of plays. Finally, a program data editor may be provided for editing the digital program data, as for adding production effects, digitally mixing of previously recorded components of programs, and the like.

OBJECTS AND ADVANTAGES OF THE INVENTION

The principal objects of the present invention are: to provide an improved system for recording and playing back audio signals; to provide such a system in which the audio signal is digitized for storage on a digital storage medium and which is converted back to an analog signal for playback; to provide such a system which is capable of recording and playing back such signals representing high fidelity stereophonic audio signals, including musical signals; to provide such a system which is particularly well adapted for use by radio stations for recording commercial advertisements and other program material; to provide such a system which greatly simplifies broadcast booth procedures by eliminating the necessity for manually handling of program media, such as conventional four track tape cartridges; to provide such a system which eliminates the degradation of sound quality of such programs from playback to playback over a long period of time; to provide such a system which stores such program materials on a high performance hard disk drive of a conventional type of personal computer employing a conventional type of computer bus, and preferably an ISA bus compatible computer; to provide such a system which is capable of recording a stereophonic signal and playing back two stereophonic signals, substantially simultaneously; to provide such a system having the capability of compressing data representing the recorded program for compact storage thereof on the disk drive and re-expansion of the program data for playback; to provide such a system which allows on-the-spot recording of program materials such as news bulletins, station editorials, interviews, advertisements, and the like; to provide such a system which allows the selection of a recording for playback using a selection device, such as a mouse or trackball, in cooperation with a graphically displayed list of programs; to provide such a system which can be interfaced with traffic system software to automatically log the playing of an advertisement or program requiring a royalty to be paid for each airing; to provide such a system with a capability for scheduling the automatic playing of advertisements and other sound programs; and to provide such a broadcast digital sound processing system which is economical to manufacture and implement, convenient and precise in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a block diagram illustrating the principal components of a personal computer to which the digital sound board of the present invention is interfaced.

FIG. 4 is a block diagram illustrating the relationship of the principal software components of the digital sound processing system of the present invention.

DETAILED DESCRIPTION OF THE PREFERRED EMBODIMENTS

Figure 1:
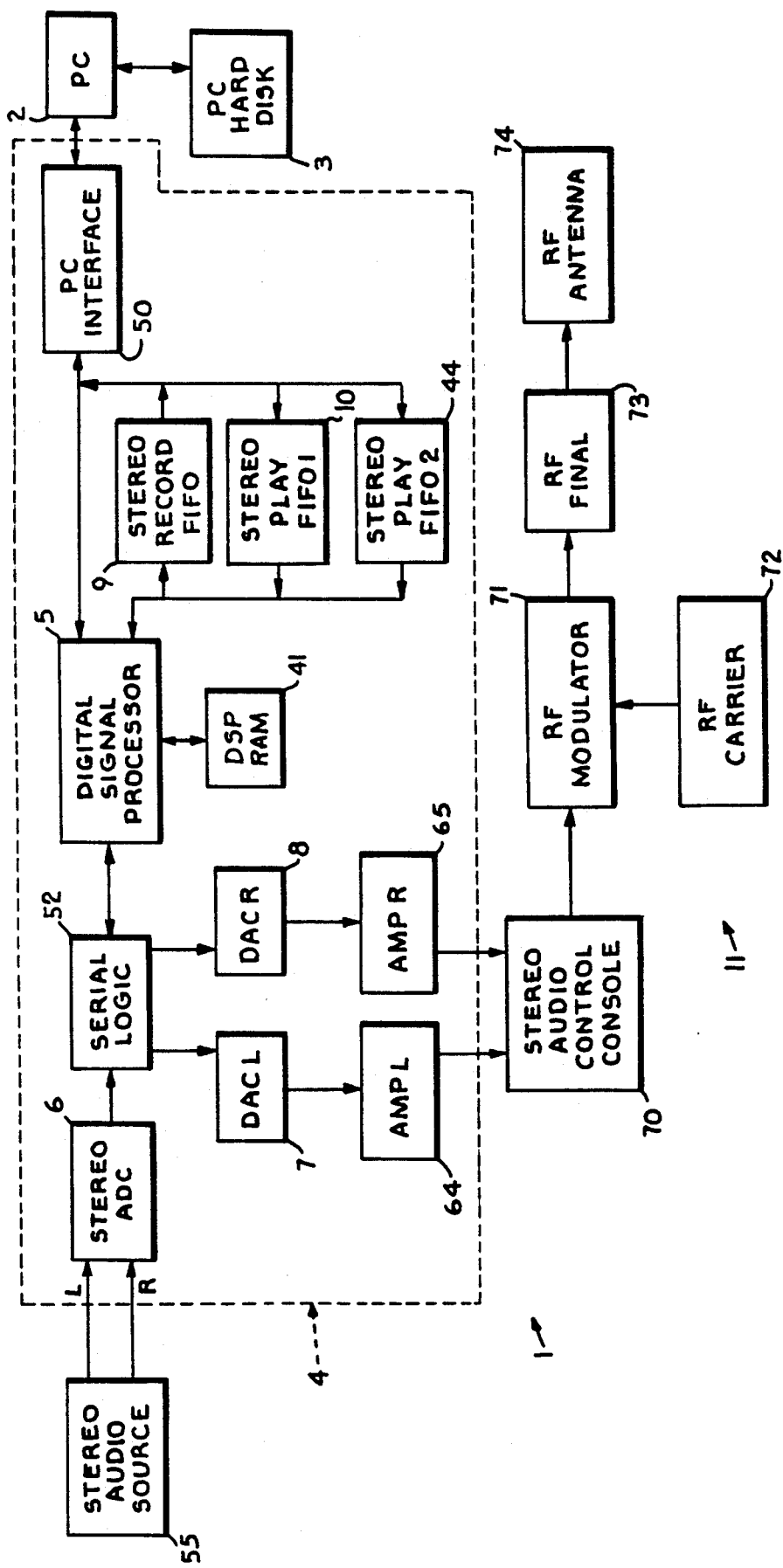
FIG. 1 is a block diagram illustrating a broadcast digital sound processing system embodying the present invention.
Figure 2:
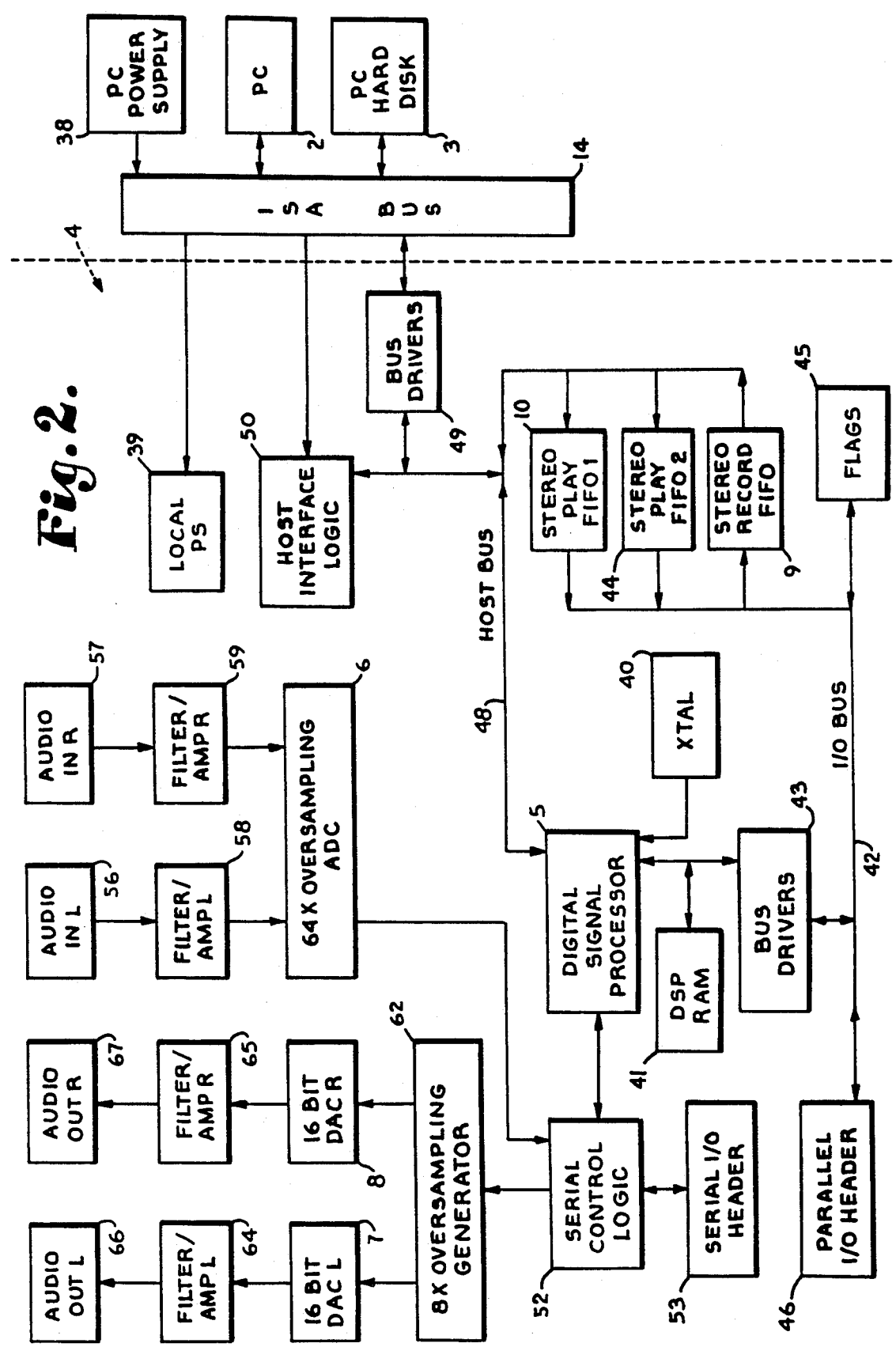
FIG. 2 is a block diagram illustrating the principal components of a digital sound processing board of the system according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a broadcast digital sound processing system embodying the present invention. The system 1 generally includes a host personal computer (PC) 2 having a hard disk 3 and a digital sound processor board 4 interfaced thereto. The board 4 includes a digital signal processor (DSP) chip 5 which is serially interfaced to a stereo input analog to digital converter (ADC) 6 and a pair of digital to analog converters (DAC) 7 and 8. The DSP chip 5 is interfaced to the PC 2, for program data transfer purposes, by a record first-in/first-out (FIFO) buffer 9 and at least one playback FIFO buffer 10. The DSP chip 5 controls the operation of the ADC 6 to digitize analog audio signals, the clocking of program data bytes into the record FIFO 9 for transfer to the disk 3 by the PC 2, the clocking of program data bytes from the play FIFO 10 which are loaded thereinto by the PC 2 from the disk 3 in a playback situation, and the operation of the DAC's 7 and 8 to reconstruct analog audio signal. The reconstructed analog audio signal may then be communicated to signal utilization equipment, such as radio frequency (RF) broadcasting stages 11.

The illustrated system 1 is primarily intended for recording stereophonic audio signals on the disk 3 and the playing back of the signals in real time to facilitate broadcast booth procedures for airing radio program materials, such as commercial advertising and the like. The capability of playing back two mixes stereo signals is also desirable, particularly for such effects as crossfading messages. A goal of the invention is to implement such a system on a common type of personal computer which is widely available and, thus, likely to be familiar to radio station personnel who will use the system. A further advantage of this approach is economy, since widely available types of computers tend to be competitively priced. A particular challenge in the preferred implementation of the present invention is achieving the throughput of program data to and from the computer disk 3 required to allow the simultaneous recording and playback of audio signals having full FM stereo quality in real time.

Referring to FIG. 3, the personal computer 2 is preferably a computer which is compatible with the Industry Standard Architecture or ISA bus 14. The ISA bus 14, also referred to as the "AT" bus because of its origin as the bus arrangement of the IBM PC/AT computer (IBM Corporation), has sixteen data lines and twenty four address lines. ISA bus computers are based on the Intel Corporation's 80286 sixteen bit microprocessor, which is currently manufactured by other companies, and typically operate under the MS-DOS (Microsoft Corporation) disk operating system 15 (FIG. 4). The computer 2 includes a host central processing unit (CPU) 16, which is an 80286 microprocessor or a backward compatible processor, such as the Intel 80386 or 80486 processors. The operation of the CPU 16 is timed by a master clock circuit 17 which provides the CPU 16 with a basic clock rate of twelve megahertz (Mhz). Computers with faster clock rates may be employed in the system 1; however, CPU clock frequencies greater than 12 Mhz provide no significant advantage in the system 1. The system 1 may employ a slower master clock 17 with reduced capability. The system 1 may also be implemented using an eight bit PC/XT (IBM Corporation) compatible computer 2 with still further reduction in capability. Besides the illustrated ISA bus 14, other standard and proprietary buses are envisioned for implementing the system 1.

As is illustrated in FIG. 3, the bus 14 is the main communication interface among the various components of the computer 2. The computer 2 preferably includes in excess of 640 kilobytes of read/write memory (RAM) to allow for a full main, or conventional, RAM 20 and a block of so-called expanded RAM 21. Expanded RAM is an industry standard provision for increasing the memory of ISA computers beyond the conventional 640 kilobytes by bank switching segments of extended RAM (not shown) addressed above one megabyte into a segment of the memory map of the CPU 16 between 640 kilobytes and one megabyte. Standard protocols have been developed by consortiums of computer manufacturers for managing expanded RAM, including Expanded Memory Specifications (EMS) 3.2 and 4.0. The computer 2 includes a basic input/output system (BIOS) 22 in read-only memory (ROM) which is a collection of routines for managing the lowest level operations of the computer 2, such as initial bootup, power-on self test, communication between the CPU 16 and peripheral devices, and the like. External user interfacing to the computer 2 is by means of a keyboard 23 connected by a keyboard interface 24 to the bus 14, a video display 25 connected to the bus 14 by a graphics controller 26, a printer 27 connected to the bus 14 by a printer interface or port 28, and preferably a point and select device 29 and selection device port 30. The selection device 29 may be a trackball, a mouse, light pen, or other similar type of point and select type of device. The computer 2 includes a battery backed time of day clock 31 which continues to function when the computer 2 is powered down.

The hard disk 3 is interfaced to the ISA bus 14 by means of a disk controller 33 which may also control a floppy disk drive 34. The controller 33 is a high performance disk controller and is preferably an industry standard Small Computer System Interface or SCSI type of host interface adapter. The SCSI interface 33 is capable of high rates of data transfer, on the order of ten megabits per second, and is capable of controlling seven storage devices, not including the floppy drive 34. The SCSI interface 33 is preferred in the system 1 because of its data transfer capabilities and the number of storage devices it can control. Other types of disk controllers with similar or lesser capabilities could also be employed in the system 1.

The SCSI interface 33 has an on-board direct memory access (DMA) controller (not shown) which controls the transfer of data between the disk 3 and main RAM 20 independently of the CPU 16 after receiving a command therefrom. The computer 2 also has a host DMA controller 35 which conventionally controls the transfer of data to and from main RAM 20 and external I/0 devices, such as the floppy disk 34 and conventional hard disks. The system 1 does not make use of the host DMA controller 35 during the transfer of program data between the disk 3 and the main RAM 20 or between the sound processor board 4 and the computer 2.

The hard disk drive 3 is a high capacity, high performance disk drive which allows a considerable amount of data to be stored thereon and accessed very quickly. In order to increase the data transfer therefrom by minimizing disk head activity, the disk 3 is specially formatted with a thirty-two kilobyte cluster format 36 which is much larger than normal MS-DOS formatting. A special formatting driver is provided by the system 1 for such purposes, since the standard versions of the operating system 15 do not provide for such large clusters. A hard disk 3 which is preferred for the system 1 is a Seagate Wren VII Series, Model 94191-766. This disk has an unformatted capacity of 766 million bytes for a nominal formatted capacity in excess of 600 megabytes. This disk has a rotation rate which is faster than the typical 3600 r.p.m. of conventional hard disks and an average access time on the order of ten to sixteen milliseconds. These high performance features of the preferred hard disk contribute to the ability of the system 1 to transfer digitized high fidelity stereophonic audio signals during recording and playback thereof.

Another factor which contributes to the program data transfer throughput of the system 1 is the selection of a computer 2 having a higher than conventional bus clock rate. The bus clock rate is the rate at which data bytes and words can be clocked over the bus 14 and is derived from the master clock 17. Conventional ISA computers operate at an eight megahertz bus clock rate. This is a somewhat informal industry standard which ensures that expansion boards from a great variety of manufacturers will operate on computers which adhere to the 8 Mhz bus frequency. However, greater throughput on the bus 14 is enabled by a higher bus clock rate, and some manufacturers provide capabilities for benefiting from such enhancement. An exemplary computer 2 which provides for a bus clock rate exceeding the standard 8 MHz rate is the Epson Equity III+ computer (Epson America, Inc.). The Equity III+ is an ISA compatible computer with a 12 Mhz CPU and, in current versions, a 12 Mhz bus clock. Computers from other manufacturers provide similar features; therefore, the system 1 is not intended to be limited to components from any particular manufacturer.

The computer 2 is provided with a plurality of ISA standard expansion slot connectors (not shown) which connect to the bus 14. The connectors may include 8 bit connectors and 16 bit connectors. The slot connectors provide for upgrading the computer 2 by the installation of expansion cards, such as the sound processor board 4, to provide additional capabilities to the basic computer 2. Typically, the graphics controller 26, a printer port card containing the printer port 28, the selection device port 30, and the disk controller 33 are provided as expansion cards which are installed in such slot connectors. The computer 2 includes a host power supply 38 which provides DC power for operating all the components thereof. The power supply 38 is connected to the bus 14 to provide power to expansion cards. The sound processor board 4 has a local power supply (PS) 39 which principally consists of voltage regulators and filters for the digital and analog components on the board 4.

The digital signal processor or DSP chip 5 is the principal control element on the sound processor board 4. A preferred component for implementing the digital signal processing functions of the system 1 is a Motorola DSP 56001 chip. The DSP 56001 chip is a high performance dedicated type of microprocessor which is designed for handling a high throughput of digital signals, such as for industrial monitoring and controlling functions. Alternatively, other digital processing devices could be employed in the system 1. The illustrated DSP chip 5 is operated at a 20 MHz clock rate which is generated by an internal oscillator using a frequency standard provided by an external crystal 40 connected to the DSP chip 5. The DSP chip 5 has an on-chip ROM which controls its boot-up and initialization processes and is connected directly to external DSP RAM 41. The DSP RAM 41 is a high speed static RAM and has a 24 bit data width. In the system 1, the DSP RAM 41 may be either eight or thirty-two kilowords, the words being 24 bit words.

The sound processor board 4 is provided with a parallel input/output (I/O) bus 42 which is driven by I/O bus transceivers or drivers 43 to provide communication with a DSP side of the two port FIFO's 9 and 10 and a second playback FIFO 44, a flags register 45, and a parallel I/0 header 46. The parallel header 46 is provided for parallel communication with the DSP chip 5 from external devices, such as a second sound processor board, or the like, which may be desirable in future developments of the system 1.

The DSP chip 5 communicates with the computer 2 for the transfer of commands from the computer 2 and requests for service from the DSP chip 5 over a parallel host bus 48 which is driven by bus transceivers or drivers 49. In order for the sound processor board 4 to be recognized by the computer 2 and for the sound processor board 4 to recognize that commands from the computer 2 are directed to it, the board 4 must be addressed in the I/0 map of the computer 2. This is accomplished by the host interface logic 50. The host interface logic 50 is an arrangement of switches, such as DIP switches, and logic circuitry (not shown in detail) to interpret the switches by which the user can set the address of the board 4 and, additionally, the interrupt request (IRQ) number for the board 4. This user configuration capability is provided to avoid I/0 address and IRQ conflicts between the board 4 and other boards which might exist in the computer 2. Other parameters of the board 4 may also be configured by use of the host interface logic 50. The computer 2 communicates program data to the board 4 for playback purposes over the host bus 48 which is connected to the computer side of the FIFO's 9, 10, and 44.

The DSP chip 5 communicates serially with the DAC's 7 and 8 and the ADC 6 by means of serial control logic 52 which creates a synchronous serial interface therebetween. A stream of samples from the ADC 6 during recording are clocked into the DSP chip 5 by cooperation between the serial logic 52 and the DSP chip 5. Similarly, a stream of program data words comprising a program to be played are clocked from the DSP chip 5 into the DAC's 7 and 8. The sound processor board 4 includes a serial I/O header 53 connected to the serial logic 52 for recording programs on the disk 3 from digital output sources, such a compact discs, digital audio tape, or the like.

The analog audio signal to be digitized and stored by the system 1 is received from a stereophonic audio source 55 (FIG. 1) which may be a tape player, a turntable, an analog output of a compact disc player, microphones, or the like. Left and right audio input connectors 56 and 57 communicate left and right audio signal components to respective left and right input filter/amplifier arrangements 58 and 59. The audio inputs are user configurable and may be either active balanced or unbalanced. In the system 1, the audio signals may have a frequency range from 20 KHz to 15 KHz. The filter components are RLC filters which eliminate signal components above approximately 250 KHz. This eliminates the possibility that an AM broadcast station's RF signal could swamp or overload the input amplifiers. With the RLC filters, several volts of RF in the AM band will not cause a measurable response in the output thereof. Higher frequencies around 2 MHz may cause a beat with the digitization frequencies, producing an audible tone in played back signals.

The RLC filters are followed by differential amplifiers connected to gain/loss stages which are adjustable by trim potentiometers. Capacitance in feedback circuits of the gain stages additionally filter high frequency RF components. Outputs of these filters are followed by zener diode clamps which limit the input signal to the ADC 6 to less than five volts. Finally, the input signals are fed through resistors and across final filter capacitors before entering the ADC 6 which match the analog signals to the input impedance of the ADC 6 and provide last stages of high frequency filtering.

The ADC 6 is a stereo input, 64 times oversampling, 16 bit output analog to digital converter. A preferred component for this purpose is a Crystal Semiconductor CS5326. The illustrated ADC 6 samples at 64 times the output sample rate. Oversampling simplifies the requirements of the filtering in the filter/amplifier blocks 58 and 59. An internal signal processor within the ADC 6 decimates the oversampled data to generate a single output value for each of the left and right channels. Left and right output words for the same sampling period are alternated on a synchronous serial output line which connects to the serial control logic 52.

During playback a serial stream of alternating left and right program data words are fed from the DSP chip 5 through the serial control logic 52 to an eight times oversampling generator 62 which demultiplexes the left and right words and sends them to the left and right DAC's 7 and 8. A preferred oversampling generator is the Seponics SM5813AP 8X oversampling generator, while the DAC's 7 and 8 are preferably Burr Brown PCM56P 16 bit digital to analog converters. Oversampling is employed in the digital to analog conversion for the same reasons as in sampling; namely to simplify filtering of the analog signals from the DAC's 7 and 8. The reconstructed left and right analog signals are fed to respective left and right output filter/amplifier stages 64 and 65. The analog signals may be adjusted in level and balanced or unbalanced, according to the user's configuration of the system 1. The reconstructed signals are available on left and right audio outputs 66 and 67.

For broadcasting a program stored by the system 1, the reconstructed signals are fed to a stereo audio control console 70 located in the broadcasting booth of a radio station which allows audio signals from a number of types of sources to be mixed for airing. The console 70 is connected to an RF modulator 71 which modulates an RF carrier signal from an RF oscillator 72 to derive a modulated radio signal which is amplified in an RF final amplifier 73 and used to energize an RF antenna 74 for broadcasting the program.

The FIFO's 9, 10, and 44 enable high speed, asynchronous transfer of program data bytes between the DSP chip 5 and the computer 2. A preferred component for the FIFO's 9, 10, and 44 is a Vitelic V61C01P40. The illustrated FIFO's are two port, 512 byte devices which generate signals depending on certain states of their contents. These signals indicate empty, half full, and full and are latched for each FIFO in the flags register 45. The two port arrangement allows the DSP chip 5 and the computer 2 to read from or write to the FIFO's independently. When a program signal is being recorded, the DSP chip 5 converts the serial words from the ADC 6 to parallel program data bytes and continually clocks the bytes into the record FIFO 9. When the FIFO 9 is half full, an interrupt is sent to the computer 2 which is serviced by reading 256-bytes and transferring them to the disk 3. The illustrated FIFO's 9, 10, and 44 have eight bit data widths. Performance gains might be achieved by implementing each particular FIFO as a parallel set of eight bit wide FIFO's to increase its data width. Greater FIFO buffer depth could be achieved by stacking multiple FIFO's end to end.

The computer 2 reads bytes from the FIFO 9 by repeated IN (input) instructions. During the time that the computer 2 is transferring bytes from the FIFO 9, the DSP chip 5 continues to clock bytes thereinto. The nature of the FIFO maintains the order of the bytes therein. Neither the DSP chip 5 nor the computer 2 is required to address individual bytes within the FIFO's. Only the ends of the stack of bytes within the FIFO's are dealt with by external devices. The FIFO's are written to on one side or port and read from the other port, and as each byte is read out, it is cleared. During playback of a program, the computer 2 writes 256 byte blocks of bytes by repeated OUT (output) instructions into the first play FIFO 10 while the DSP chip 5 continuously reads the bytes out and transfers them to the serial control logic 52. The DSP chip 5 performs a parallel to serial conversion during this process. The second play FIFO 44 is provided for communicating a second program signal to the DSP 5 for mixing with the first for such purposes as crossfading of program signals. If a second signal is being played, the DSP chip 5 reads the play FIFO's 10 and 44 in alternation. The signals are mixed digitally within the DSP chip 6 to provide a single monaural or stereo data stream to the serial control logic 52.

The system 1 is capable of 16 bit sampling of stereo audio signals at a preferred effective sampling rate of 32 KHz and playing back a pair of 16 bit sampled stereo signals. This provides the highest quality of which the system 1 is capable, as far as fidelity and audio bandwidth are concerned. The storage overhead for 16 bit stereo signals on the disk 3 amounts to about 7.5 megabytes per minute of signal. Not all programs recorded by the system 1 require such quality. For example, if the program message is entirely vocal or if the system 1 is used in an AM radio station, such levels of quality may not be needed. Additionally, most AM radio stations do not have stereophonic capability. For these reasons, the system 1 provides for user selection of the recording and playback quality. The ADC 6 always samples at a 16 bit resolution. However, the DSP 5 may be programmed to provide full 16 bit samples or to truncate four or eight of the lowest significant bits of each sample to provide either 12 or 8 bit samples. Lower resolution samples decrease the storage requirements per unit of signal time on the disk 3. An 8 bit sampled monaural signal requires a storage capacity on the disk 3 of just under two megabytes per minute of signal. Thus, the preferred disk 3 with approximately 600 megabytes of storage capacity can store from about 80 minutes of 16 bit encoded stereo signals to almost 5.5 hours of 8 bit encoded monaural signals.

The system 1 has the capability of greater storage efficiencies by the use of data compression techniques during recording and decompression upon playback. In the system 1, a standard exponential type of data compression known as aLaw compression is preferred. In an exponential data compression algorithm, a sample word is encoded to the exponent or logarithm of the binary value of a sample word to a selected number of significant bits. Such compression and decompression may introduce some inaccuracy into the conversion process; however, increased storage efficiency is gained. Another compression method which may be employed in the system 1 is a similar process called uLaw compression. Alternatively, other types of companding algorithms could be employed in the system 1.

When the conversion and data compression processes result in data words of other than eight bits, it is desirable for the DSP chip 5 to assemble the twelve or sixteen bit data words into eight bit bytes to avoid wasting space on the disk 3. This is referred to data packing in the system 1, and a corresponding unpacking operation is then required during playback. Because of the variations in the manner in which signals may be recorded in the system 1, it is desirable that when a program data file 75 (FIG. 4) is created on the disk 3, information is included which indicates the sample bit resolution and the type of compression if any by which the associated signal was recorded and whether the signal is stereo or mono to inform the DSP chip 5 the manner in which to reconstruct the signal from the digitized data representing same.

In addition to the hardware components of the system 1, a number of software components are required to implement the functions of the system 1 and the cooperation of the hardware thereof to perform such functions. Referring to FIG. 4, the host BIOS 22 controls the operation of the computer 2 at the machine level while the host DOS 15 coordinates the communications and maintenance of data files within the computer 2 and standard functions of the interface to the user thereof. A special user interfaces driver 76 is provided for coordination between the selection device 29, such as a trackball, and the display of a trackball cursor on the display 25 in relation to other information thereon. The computer 2 may be used to run a traffic system 77 to schedule and log the airing of program material, such as musical recordings, commercials, public service announcements, and other programs for accounting purposes.

The programs which are executed by the DSP chip 5 are stored in the DSP RAM 41 during operation of the system 1 and are indicated in FIG. 4 by the block entitled DSP firmware and data compounding (compressing and expanding) and labeled by the reference number 78. Communication between the DSP chip 5 and the computer 2 is enabled by a program called the DSP BIOS 79 which interfaces between the firmware 78 and the host BIOS 22. The digitized program data files 75 may be edited for production purposes by the use of a program data editor 80, for example to mix "tracks", add sound effects, removed undesired portions, or the like.

When the DSP BIOS program 79 is started, the firmware 78 is loaded into the DSP RAM 41, and the DSP chip 5 is initialized. A program data file 75 for a sound program is set up by naming it and specifying the recording parameters to be used. Commands to start and stop recording are given using the selection device 29. When a command to start recording is given, analog signals are input to the board 4 through the audio inputs 56 and 57, filtered and amplified by the filter/amplifiers 58 and 59, sampled and converted to digital words by the ADC 6, compressed if desired and packed by the DSP chip 5, and buffered through the record FIFO 9 to the computer 2. When the FIFO 9 is half full, an interrupt is sent to the host CPU 16 which causes it to transfer 256 bytes from the FIFO 9 to expanded RAM 21 which accumulates the 256 byte "microbuffers" therein until a 32 kilobyte full buffer is accumulated. At this time, the CPU 16 transfers the full buffer to main RAM 20 from which it is transferred to a named program data file 75 on the disk 3 by the DMA controller of the disk controller 33. When the audio program has been completed, a stop recording signal is given which causes the DSP chip 6 to cease transferring data bytes to the record FIFO 9 and causes the computer 2 to transfer the remaining data bytes from the FIFO 9 to expanded RAM 21 and any partially filled full buffer from expanded RAM 21 to the disk 3.

During recording a timer is run in the computer 2 to determine the time length of the recorded program. The time length of the recorded program is saved with the program data file. During playback, the process described for recording is reversed. A list of program files may be called up for display on the screen of the video display, from which a program may be selected. The time length of a selected program is also displayed. As a program is played, a countdown timer is displayed which aids in continuity of the broadcast. The computer 2 maintains a clock/calendar during operation as initialized by the time of day clock 31 when the computer 2 is booted. The interface between the DSP BIOS 79 and the traffic system 77 provides for logging the time and date of the airing of a program in an appropriate data file in the traffic system when a program is played.

While the preferred embodiment of the system 1 has features particularly suited for use in radio broadcasting, the present invention is not intended to be limited thereto. Nor is the present invention intended to be limited to strictly audio signal processing.

It is to be understood that while certain forms of the present invention have been illustrated and described herein, it is not to be limited to the specific forms or arrangement of parts described and shown. In particular, while certain components have been identified by manufacturer's designations, functionally equivalent components or arrangements of components may be substituted within the spirit of the present invention.

What is claimed and desired to be secured by Letters Patent is as follows:

1. A method of recording and playing analog program signals using signal processor means, computer means and reconstruction means interfaced to said signal processor means, and a read/write computer data disk interfaced to said computer means, said method comprising the steps of:
 (a) storing on said disk first digital program data and second digital program data representing respectively a first analog program signal and a second analog program signal;
 (b) outputting from said reconstruction means at least one of said first analog program signal and said second analog program signal by the steps of:
  (1) retrieving the program data corresponding to at least one of said program signals from said disk by cooperation of said computer means and said signal processor means; and
  (2) reconstructing in said reconstruction means the analog program signal corresponding to the retrieved program data from said retrieved program data;

(c) selectively recording a third analog program signal by digitizing said third analog program signal to derive third digital program data and storing said third program data on said disk by use of said signal processor means;

(d) selectively outputting said first analog program signal substantially simultaneous with the outputting of at least a portion of said second analog program signal; and (e) selectively recording said third analog program signal substantially simultaneous with the outputting of at least one of said first and second analog program signals.

2. A method as set forth in claim 1 and including the steps of:

(a) performing said storing step on digital data representing respectively a first stereophonic analog program signal and a second stereophonic analog program signal;

(b) performing said outputting step to output at least one of a first stereophonic analog program signal and a second stereophonic analog program signal; and (c) performing said recording step on a third stereophonic analog program signal.

3. A method as set forth in claim 1 and including the steps of:

(a) compressing said program data prior to storing same on said disk; and (b) decompressing said program data prior to said reconstructing step.

4. A method as set forth in claim 1 and including the steps of:

(a) displaying program indicia representing said program data stored on said disk on a graphics display;

(b) coordinating a selection device with said graphics display to cause selection indicia to be displayed thereon and moved on said display in correspondence to operation of said selection device; and (c) operating said selection device to cause said selection device to select said program indicia to thereby initiate said retrieving, reconstructing, and outputting steps.

5. A method as set forth in claim 1 and including the steps of:

(a) operating a time of day clock to maintain data representing a current time of day;

(b) setting a play time associated with a selected program signal in cooperation with said clock; and (c) causing said outputting steps to be initiated upon said time of day assuming said play time.

6. A method as set forth in claim 5 and including the steps of:

(a) maintaining a play log file associated with one of said program signals on said disk; and (b) causing play time data representing said play time to be entered automatically upon the occurrence of said outputting step.

7. A method as set forth in claim 1 wherein said outputting step includes the step of:

(a) radio broadcasting an analog signal which is output from said reconstruction means.

8. A method as set forth in claim 1 wherein said storing step includes the step of:

(a) storing said program data on a data storage disk on an ISA bus compatible type of personal computer.

9. A method as set forth in claim 1 and including the step of:

(a) prior to storage of said program data on said disk, formatting said disk to create data clusters of thirty-two kilobytes each.

10. A method as set forth in claim 1 and including the step of:

(a) performing said retrieving step and said recording step using FIFO (first-in/first-out) buffer means.

11. A method as set forth in claim 1 and including the steps of:

(a) performing said retrieving step on said first program data using first playback FIFO buffer means;

(b) performing said retrieving step on said second program data using second playback FIFO buffer means; and (c) performing said recording step on said third program data using record FIFO buffer means.

12. A method as set forth in claim 1 and, upon outputting said first analog program signal substantially simultaneous with the outputting of at least a portion of said second analog program signal, said method including the step of:

(a) digitally mixing program data representing said portion of said second program signal with program data representing said first program signal using said signal processor means prior to said reconstructing step.

13. A method of recording and playing analog program signals using signal processor means; analog to digital converter means, digital to analog converter means, and computer means interfaced respectively to said signal processor means; and a read/write computer data disk interfaced to said computer means; said method comprising the steps of:

(a) storing on said disk first digital program data and second digital program data representing respectively a first analog program signal and a second analog program signal;

(b) outputting from said signal processor means at least one of said first analog program signal and at least a portion of said second analog program signal by the steps of:

(1) retrieving program data corresponding to at least one of said program signals from said disk and transferring same from said computer means to said signal processor means through FIFO (first-in/first-out) buffer means interfacing said computer means with said signal processor means;

(2) constructing an analog signal corresponding to the retrieved program data by said signal processor means controlling digital to analog conversion of the retrieved program data by said digital to analog converter means;

(c) selectively recording a third analog program signal by the steps of:

(1) digitizing by said analog to digital converter means said third analog program signal to derive third digital program data;

(2) transferring said third program data from said signal processor means to said computer means through said FIFO buffer means; and (3) storing said third program data on said disk;

(d) selectively outputting said first analog program signal substantially simultaneous with the outputting of said second analog program signal; and (e) selectively recording said third analog program signal substantially simultaneous with the outputting of at least one of said first and second analog program signals.

14. A method as set forth in claim 13 and including the steps of:
(a) performing said storing step on digital data representing respectively a first stereophonic analog program signal and a second stereophonic analog program signal;
(b) performing said outputting step to output at least one of said first stereophonic program signal and said second stereophonic program signal; and
(c) performing said recording step on a third stereophonic analog program signal.

15. An apparatus for recording and playing back analog program signals, said apparatus comprising:
(a) a host computer with an ISA compatible bus;
(b) a read/write data storage disk interfaced to said computer, said disk for storage of digital program data representing program signals to record program signals and for retrieval of digital program data representing program signals to play said program signals;
(c) digitizer means receiving an analog program signal and operative to convert said analog program signal to digital program data representing said analog program signal for storage on said disk;
(d) signal reconstruction means interfaced to said computer and operative to reconstruct an analog program signal from digital program data communicated thereto;
(e) signal processor means interfaced to said digitizer means, said reconstruction means, and said computer means; said signal processor means controlling operation of said digitizer means and said reconstruction means and controlling communication of said program data from said digitizer means to said computer and from said computer to said reconstruction means;
(f) FIFO (first-in/first-out) buffer means interfacing said signal processor means and said computer and enabling independent access to said buffer means by said signal processor means and said computer to expedite transfer of said program data from said digitizer means to said computer and from said computer to said reconstruction means;
(g) said buffer means cooperating with said signal processor means and said computer to enable retrieval from said disk of program data representing two program signals and substantially simultaneous communication of said program data to said signal processor means for digitally mixing said program data and communication of the mixed program data to said reconstruction means;
(h) said buffer means cooperating with said signal processor means and said computer to enable communication of program data representing a first program signal from said digitizer means to said disk to record said first program signal and substantially simultaneous communication of program data representing a second program signal from said disk to said reconstruction means to enable playing said second program signal; and
(i) analog signal output means coupled to said reconstruction means and operative to output a reconstructed analog program signal represented by program data communicated to said reconstruction means.

16. An apparatus as set forth in claim 15 wherein:
(a) each of said digitizer means, said signal reconstruction means, said buffer means, and said analog signal output means is capable of processing signals representing stereophonic program messages.

17. An apparatus as set forth in claim 15 wherein:
(a) said digitizer means, said signal reconstruction means, said signal processor means, said buffer means, and said analog signal output means are constructed on a single ISA expansion board for communication with said bus of said computer.

18. An apparatus as set forth in claim 15 wherein:
(a) said disk is formatted with thirty-two kilobyte data clusters.

19. An apparatus as set forth in claim 15 and including:
(a) radio broadcasting means coupled to said analog signal output means and operative to radio broadcast said reconstructed analog program signal.

20. In a computer system including digital recording and playback means for digitizing an analog audio signal to store program data representing the signal on a read/write data storage disk and for reconstructing the signal from said program data retrieved from said disk, the improvement comprising:
(a) at least a portion of said disk on which said program data is stored and from which said program data is retrieved being formatted with thirty-two kilobyte data clusters.

21. A system as set forth in claim 20 wherein:
(a) said computer system operates under an operating system compatible with a version of the Microsoft Disk Operating System (MS-DOS).

22. A system as set forth in claim 20 wherein said computer system includes:
(a) an ISA compatible bus.

* * * * *